(12) United States Patent
Kesler et al.

(10) Patent No.: US 6,345,516 B1
(45) Date of Patent: *Feb. 12, 2002

(54) ADSORBENT UNIT WITH REFRIGERANT TRACER DYE COMPARTMENT

(75) Inventors: Eric W. Kesler; Donald L. Konieczny, both of Northville, MI (US); Stephen F. Sullivan, Boardman, OH (US)

(73) Assignees: Multisorb Technologies, Inc., Buffalo, NY (US); Visteon Global Technologies, Inc., Dearborn, MI (US); Halla Climate Control Canada, Inc., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/633,533

(22) Filed: Aug. 7, 2000

(51) Int. Cl.$^7$ .......................... F25B 43/04; G01M 3/20
(52) U.S. Cl. ...................... 62/503; 62/475; 62/125; 73/407
(58) Field of Search ..................... 62/503, 475, 125; 73/40.7

(56) References Cited

U.S. PATENT DOCUMENTS

| 4,911,739 A | 3/1990 | Cullen et al. ............... 55/387 |
|---|---|---|
| 4,938,063 A | 7/1990 | Leighley |
| 5,421,192 A | 6/1995 | Henry |
| 5,440,919 A * | 8/1995 | Cooper ...................... 73/40.7 |
| RE35,370 E | 11/1996 | Henry |
| RE35,395 E | 12/1996 | Henry |
| 5,636,525 A | 6/1997 | Riemenschneider ......... 62/474 |
| 5,650,563 A * | 7/1997 | Cooper et al. ............... 73/40.7 |
| 5,681,984 A * | 10/1997 | Cavestri ..................... 73/40.7 |
| 5,979,224 A | 11/1999 | Cavestri |
| 5,979,226 A | 11/1999 | Cavestri |
| 6,070,454 A | 6/2000 | Cavestri |
| 6,070,455 A | 6/2000 | Cavestri |
| 6,209,347 B1 * | 4/2001 | Corrigan et al. ............. 62/475 |

* cited by examiner

Primary Examiner—William C. Doerrler
(74) Attorney, Agent, or Firm—Joseph P. Gastel

(57) ABSTRACT

An adsorbent unit for a refrigerant accumulator having a housing with a bottom wall and a side wall and a U-shaped pipe with a return bend adjacent the bottom wall and with first and second pipe portions extending from the return bend along the side wall, and a filter body extending outwardly from the return bend, the adsorbent unit including a porous adsorbent container, adsorbent in the container, first and second end portions on the container, a first tab extending outwardly from the first end portion of the container, an elongated slot in the first tab mounting it on the first and second pipe portions, a second tab extending outwardly from the second end portion of the container, an aperture on the second tab mounting it on the filter body, and a separate compartment on the adsorbent unit outside of said container containing a fluent refrigerant tracer dye.

21 Claims, 3 Drawing Sheets

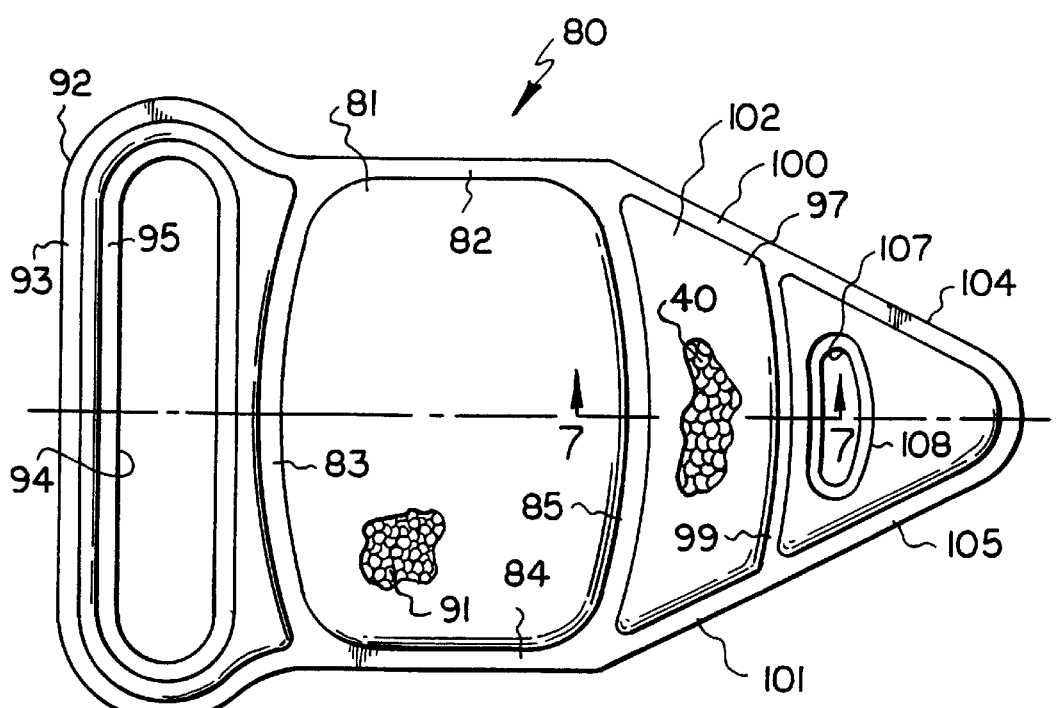
FIG. 6
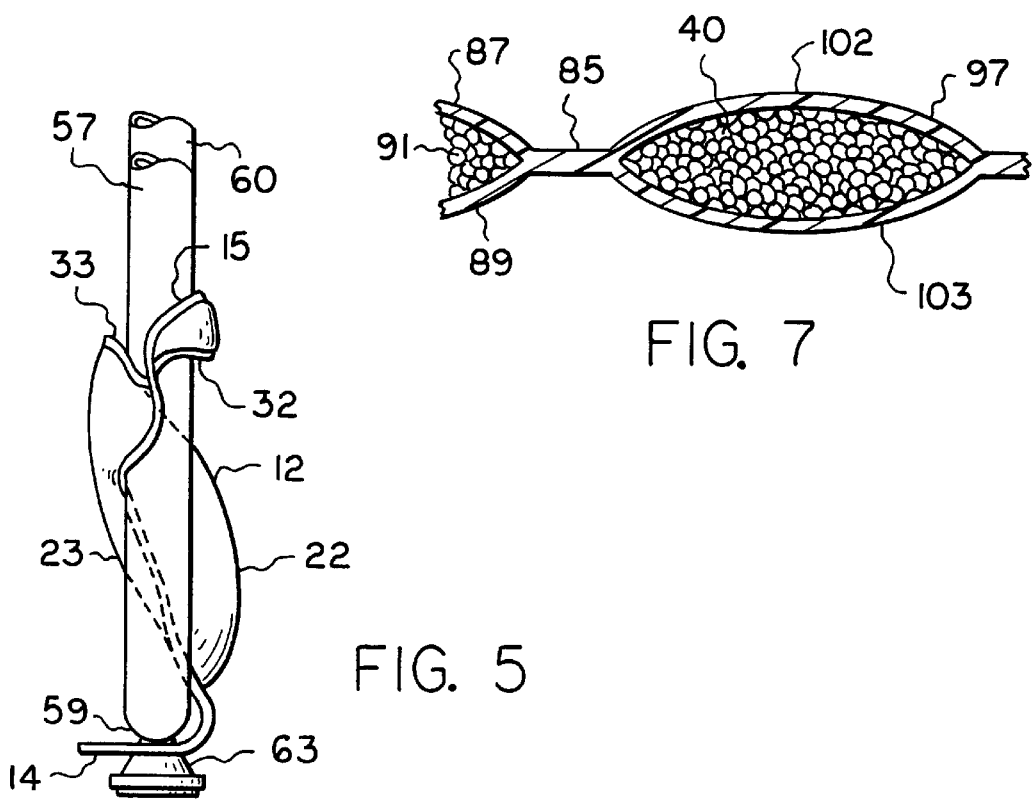
FIG. 7
FIG. 5

ADSORBENT UNIT WITH REFRIGERANT TRACER DYE COMPARTMENT

BACKGROUND OF THE INVENTION

The present invention relates to an improved adsorbent unit which contains a separate compartment containing fluent refrigerant tracer dye which is located outside of the adsorbent container of the adsorbent unit.

By way of background, adsorbent units are used in refrigerant accumulators of an automotive air conditioning system for the purpose of adsorbing moisture from the refrigerant. In the past a refrigerant tracer dye having different forms was placed directly into the adsorbent container portion of the adsorbent unit. Examples of the various ways in which this was done are shown in U.S. Pat. No. 5,650,563. The purpose of the refrigerant tracer dye was to detect refrigerant leaks in the system by displaying the color of the tracer dye at the point of leakage when the refrigerant system was tested. If the tracer dye mingled with the adsorbent, it could cause erroneous high water content readings of the adsorbent. In the past, as shown in U.S. Pat. No. 5,650,563, in one embodiment the tracer dye was placed in powder form in a filter bag within the adsorbent container. Thus, the dye had to pass through the filter bag, then pass through the adsorbent and then through the permeable casing of the adsorbent unit before it reached the refrigerant stream. It is with overcoming the foregoing deficiency in an extremely simple and expedient manner that the present invention is concerned.

BRIEF SUMMARY OF THE INVENTION

It is one object of the present invention to integrate fluent refrigerant tracer dye into a separate compartment outside of the adsorbent container of the adsorbent unit to thereby not only prevent interaction between the refrigerant tracer dye and the adsorbent but also permit it to have a direct path into the refrigerant stream.

It is another object of the present invention to not only have a fluent refrigerant tracer dye in a separate compartment outside of the adsorbent container of the adsorbent unit, but also to place such fluent refrigerant tracer dye directly into the tracer dye compartment during manufacture of the adsorbent unit without requiring that the refrigerant tracer dye be formed into any special configuration or placed into a separate packet before it is placed in the adsorbent unit.

A further object of the present invention is to provide an adsorbent unit having a separate compartment of refrigerant tracer dye outside of the adsorbent container of the adsorbent unit wherein fluent refrigerant tracer dye merely has to pass through a single porous wall of the tracer dye compartment in order to mix with the refrigerant of the air conditioning system. Other objects and attendant advantages of the present invention will readily be perceived hereafter.

The present invention relates to an adsorbent unit for an air conditioning system comprising a porous container, adsorbent in said container, a fluent refrigerant tracer dye, and a separate compartment on said adsorbent unit outside of said porous container containing said fluent refrigerant tracer dye.

The present invention also relates to an adsorbent unit comprising a porous adsorbent container having a width, adsorbent in said container, a tab extending outwardly from said container, an elongated slot in said tab extending in the direction of said width of said container and said tab having a length which approximates the widest portion of said container, and a compartment on said tab containing a fluent refrigerant tracer dye.

The present invention also relates to an adsorbent unit for mounting relative to a U-bend pipe of a refrigerant accumulator having spaced pipes and a return bend comprising a porous container, adsorbent in said container, first and second end portions on said container, first mounting means on said first end portion for placement about said spaced pipes with said container located between said first mounting means and said return bend, second mounting means at said second end of said container for mounting relative to said return bend, and a separate compartment on said adsorbent unit outside of said container containing a fluent refrigerant tracer dye.

The present invention also relates to a refrigerant accumulator having a housing with a bottom wall and a side wall and a U-shaped pipe with a return bend adjacent said bottom wall and with first and second pipe portions extending from said return bend along said side wall, and a filter body extending outwardly from said return bend, the improvement of an adsorbent unit comprising a porous adsorbent container, adsorbent in said container, first and second end portions on said container, a first tab extending outwardly from said first end portion of said container, an elongated slot in said first tab mounting said first tab on said first and second pipe portions, a second tab extending outwardly from said second end portion of said container, an aperture on said second tab mounting said second tab on said filter body, and a compartment on said first tab containing a fluent refrigerant tracer dye.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 5 is a fragmentary side elevational view taken substantially in the direction of arrows 5—5 of FIG. 4;

FIG. 6 is a plan view of another embodiment of an adsorbent unit having a separate compartment containing fluent refrigerant tracer dye; and FIG. 7 is a cross sectional view taken substantially along line 7—7 of FIG. 6.

DETAILED DESCRIPTION OF THE INVENTION

Figure 1:
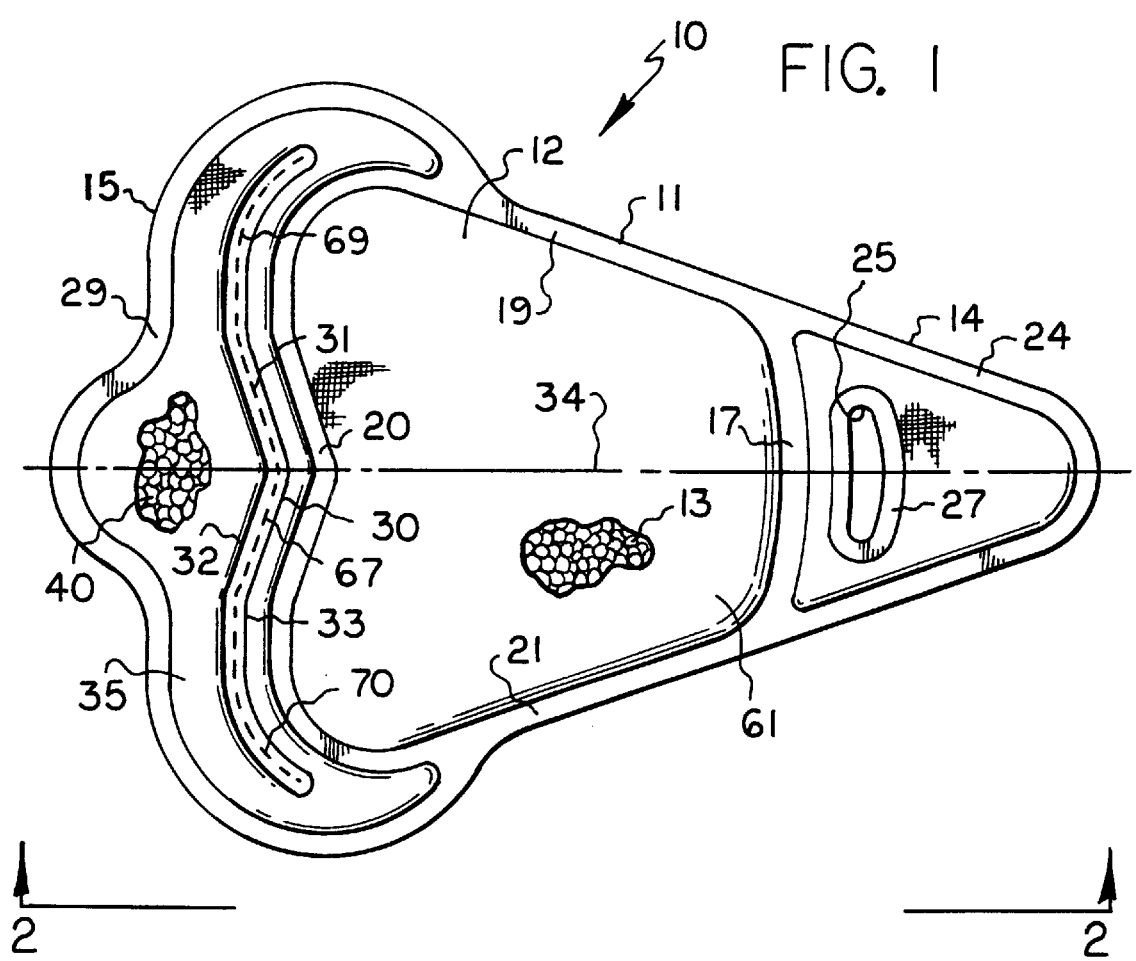
FIG. 1 is a partially broken away plan view of an adsorbent unit having a separate compartment into which the fluent refrigerant tracer dye can be incorporated.
Figure 2:
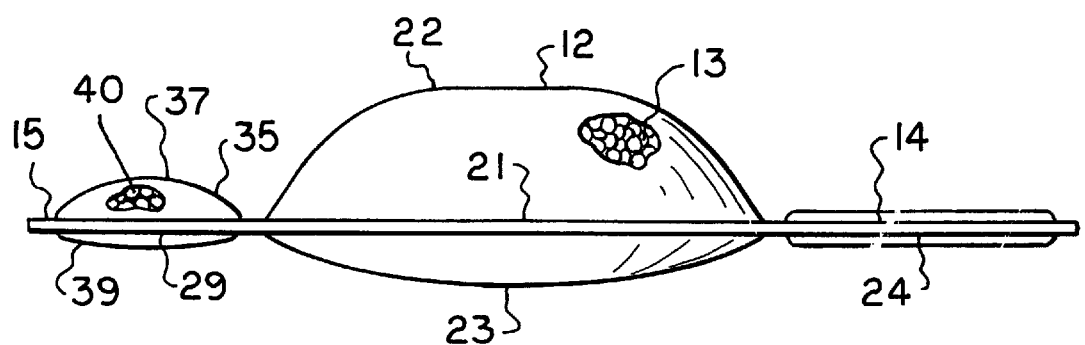
FIG. 2 is a side elevational view taken substantially in the direction of arrows 2—2 of FIG. 1.
Figures 3, 4:
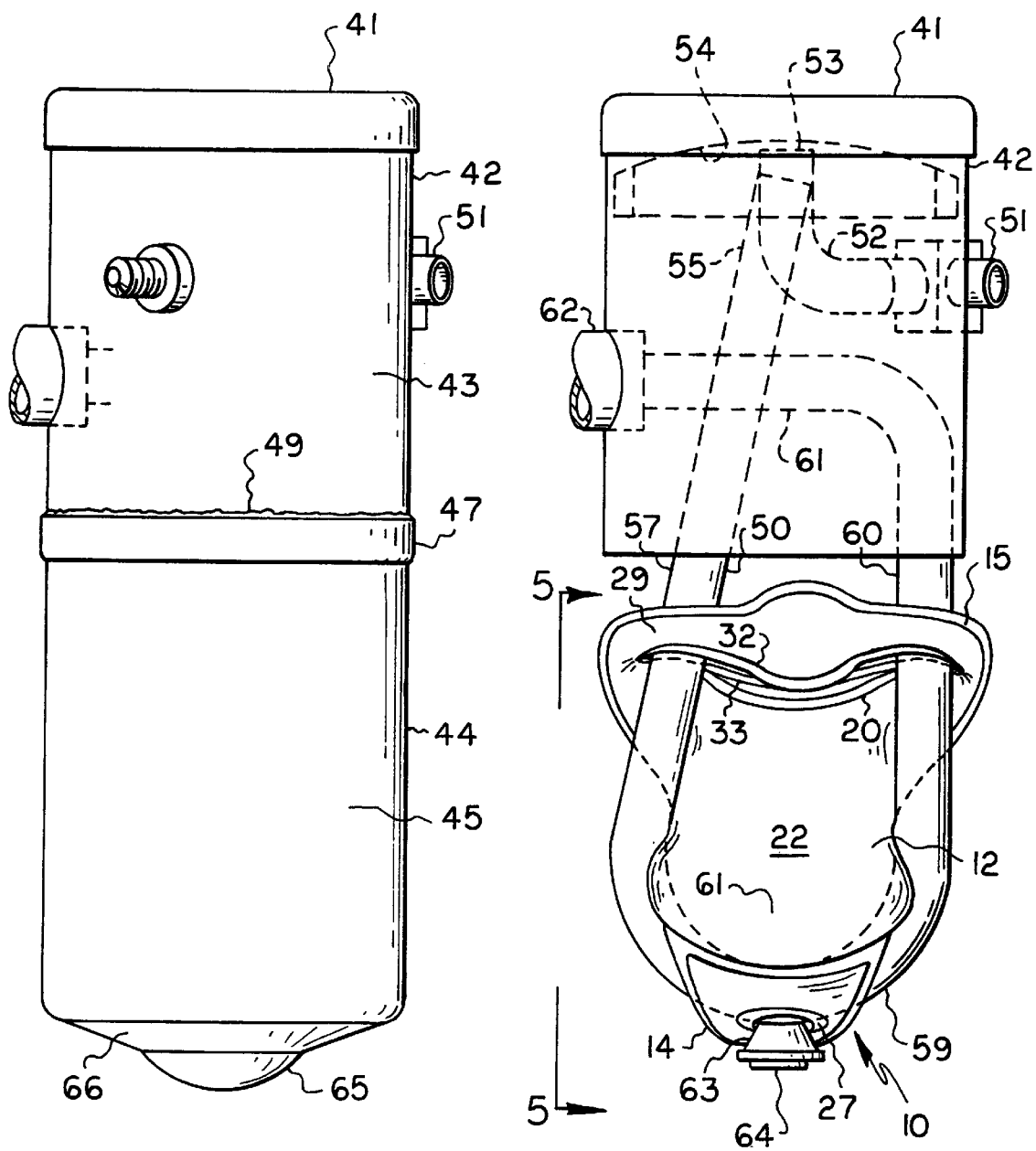
FIG. 3 is a side elevational view of a prior art accumulator type of receiver into which the adsorbent unit of FIGS. 1 and 2 can be mounted.
FIG. 4 is a side elevational view of the accumulator of FIG. 3 with the bottom portion removed and the adsorbent unit of FIGS. 1 and 2 mounted relative to the U-bend pipe therein.

In FIGS. 1, 2 and 4 an embodiment of an adsorbent unit 10 is shown in which a compartment containing refrigerant tracer dye is outside of the compartment which contains the desiccant. Adsorbent unit 10 includes a casing 11 formed of porous material, in this instance, heat-fusible felted polyester, but it may be fabricated of any other suitable material. Casing 11 is formed from two sides of felted polyester which are bonded to each other by fused seams, and it comprises a container 12 containing adsorbent 13 with the container having apertured tabs 14 and 15 at opposite end portions thereof. Adsorbent container 12 is defined by fused seams 17, 19, 20 and 21. Container 12 has a pronounced convex surface 22 and a less convex surface 23. Tab 14 includes an outer fused seam 24 which merges into the junction between seams 17 and 19 and between the junction of seams 17 and 21. Tab 14 includes an elongated aperture 25 which is outlined by fused seam 27. Tab 15 is defined by fused seams 20 and 29. First ends of seams 20 and 29 merge into seam 19 and second ends of seams 20 and 29 merge into seam 21. In tab 15 there is a fused seam 30 which has a slit 31 therein, and the slit 31 extends substantially throughout the entire length of the seam 30 and is outlined by fused seam portions 32 and 33 on opposite sides of slit 31. Slit 31 extends transversely to the central longitudinal axis 34, and its length approximates the widest portion of the container 12.

A refrigerant tracer dye compartment 35 is formed in tab 15, and it includes opposite sides 37 and 39 (FIG. 2), and it extends between fused seams 29 and 20 and is separated from slit 31 by fused seam portions 32 and 33. Fluent refrigerant tracer dye granules 40 (FIG. 1) are housed within compartment 35. The granules 40 are thus housed in a compartment which is outside of the container 12 which contains the desiccant 13. In addition, the refrigerant tracer dye compartment 35 is isolated from the desiccant container 12 by non-porous fused seam 20 through which the tracer dye cannot migrate into the desiccant 13 in container 12. Also, since the dye granules can spread out within compartment 35, the tracer dye has a relatively large surface area of compartment sides 37 and 39 through which it can pass.

The refrigerant tracer dye is in granular or powdered form and thus can be considered fluent. The tracer dye could be that fully described in U.S. Pat. No. 5,650,563 as follows: The tracer dye could be
Naphtho(3,2,1-k1)xanthene-2,8 dialkyl
3,9-perylenedialkylacetate
4-alkylamino-n-alkyl-naphthalimide
Dinaphtho(1,2,3-cd; 1'2'3-1m)perylene-9,18-dione, alkyl derivatives
The fluent tracer dye could also be any other suitable dye.

The adsorbent unit 10 is intended to be mounted in a prior art accumulator-type of receiver 41 (FIGS. 3 and 4) which includes an upper cylindrical housing portion 42 having a side wall 43 and a lower cylindrical housing portion 44 having a side wall 45 and having a flange 47 which receives the lower edge portion of upper portion 42 with an interference fit, and a joint is thereafter hermetically welded at 49. Insofar as pertinent here, the accumulator 41 includes a U-bend pipe 50 having a refrigerant inlet end 51 which receives a mix of gaseous and liquid refrigerant and conducts it through pipe 52 having an open end 53 proximate concave surface 54 such that the refrigerant impinges thereon and enters the accumulator. The upper end 55 of U-shape pipe 50 is open and it receives gaseous refrigerant which passes through pipe 57, return bend 59, pipe 60, and pipe 61 to outlet 62 which leads to the compressor, as is well known in the art. As noted above, the gaseous refrigerant passes through U-shaped tube 50 because it rises to the top while the liquid refrigerant from the evaporator drops to the bottom of the accumulator. A lubricant inlet (not shown) is located at the underside of the return bend 59. A filter housing 63 having a filter 64 thereon is in communication with the lubricant inlet in the return bend 59 such that lubricant which accumulates in depression 65 of bottom wall 66 is induced into the return bend and conveyed with the gaseous refrigerant to the compressor, as is well known in the art. As can be seen from FIG. 4, the U-bend 50 includes two spaced pipes 57 and 60 which are connected by return bend 59. In the present instance, pipe 60 is substantially vertical and pipe 57 is inclined. The U-bend 50 is sometimes referred to as a J-bend.

The adsorbent container 12 is broadly of trapezoidal configuration in plan except that the opposite ends 17 and 20 are curved. The trapezoidal configuration enhances the installation of the adsorbent unit 10 relative to spaced pipes 57 and 60 of U-bend 50 of the refrigerant accumulator. In this respect, the adsorbent unit 10 is installed by passing the return bend 44 through the elongated slit 31 to the position shown in FIGS. 4 and 5. The narrow end 61 of trapezoidal container 12 fits between the spaced pipes 57 and 60 and thus provides less bulging of the bag. Additionally, as can be seen from FIG. 5, since the bag is curved in passing between the legs, it causes the bag to occupy less height above return bend 59, that is, it is lower down on the U-bend so that its uppermost portion is more remote from the weld 49 (FIG. 3). The slitted opening 31 permits the entire adsorbent unit 10 to be shorter than comparable embodiments having a wide slot, which, in turn, also permits the tab 15 to be further away from weld 49. Additionally, since a slit 31 is being utilized to receive the spaced pipes 57 and 60, this will cause the outer portion of tab 15 to lie closer to adsorbent container 12. It will be appreciated that the slit 31 has to be sufficiently long to receive the widest portion of U-bend pipe 50, namely the return bend 59, so that tab 15 can be moved to the position of FIGS. 4 amd 5, and to this end, slit 31 is curved as shown at both its central portion 67 and its ends 69 and 70 so that the required length of slit is obtained to receive the return bend 59 during the mounting of tab 15 on spaced pipes 57 and 60. In its installed position, the aperture 25 in tab 14 receives the filter housing 63 as shown in FIGS. 4 and 5.

In FIGS. 6 and 7 another embodiment of an adsorbent unit 80 is shown which differs from the preceding embodiment. In the embodiment of FIGS. 6 and 7 the adsorbent container 81 has fused seams 82, 83, 84 and 85 which join sides 87 and 89 between which adsorbent 91 is contained. The tab 92 is in the form of a loop 93 having an oval-like opening 94 bounded by fused seam 95 which functions in substantially the same way as slit 31 to receive the spaced legs of a U-bend pipe. The embodiment of FIGS. 6 and 7 differs from the preceding embodiment in that the fluent tracer dye compartment 97, which contains tracer dye granules 40, is formed between fused seam 85, fused seam 99 and fused seams 100 and 101 which join seams 85 and 99. The tracer dye compartment is further defined by porous polyester sides 102 and 103. A tab 104, which is analogous to tab 14 of FIGS. 1 and 2 is defined by fused seam 99 and fused seam 105. An aperture 107, which is outlined by fused seam 108, is located in tab 104, and it is analogous to aperture 25 of FIG. 1 and it functions in the same manner. Actually compartment 97 may be considered to be part of tab 104 inasmuch as it is adjacent thereto. It will be appreciated that the adsorbent unit 80 is formed of two sheets of felted polyester fabric which are joined by fused seams in the same manner as adsorbent unit 10 of FIGS. 1 and 2. It is to be noted that the fluent refrigerant tracer dye compartment 97 is immediately adjacent to the adsorbent container 81 and separated therefrom by fused seam 85. This is in contrast to the embodiment of FIGS. 1 and 2 wherein the fluent adsorbent compartment is more remote from the adsorbent container because it is located in the tab 15 which has a slit 31 therein so that the tab 15 functions as a loop, such as shown in FIG. 6. It will be appreciated that the fluent refrigerant tracer dye compartment may also be incorporated within the fused seams which define the adsorbent container provided that it is outside of the porous adsorbent container in the sense that it is separated therefrom by a fused seam.

While preferred embodiments of the present invention have been disclosed, it will be appreciated that the present invention is not limited thereto but may be otherwise embodied within the scope of the following claims.

What is claimed is:

1. An adsorbent unit comprising a porous adsorbent container having a width, adsorbent in said container, first and second end portions on said container, first and second tabs extending outwardly from said first and second end portions, respectively, of said container, a central axis extending through said container and said first and second tabs, an elongated slot in said first tab extending transversely to said central axis, said elongated slot having a length which approximates said width of said container, an aperture in said second tab, and a compartment on at least one of said first and second tabs containing a fluent refrigerant tracer dye.

2. An adsorbent unit as set forth in claim 1 wherein said compartment is on said first tab.

3. An adsorbent unit as set forth in claim 1 wherein said compartment is on said second tab.

4. An adsorbent unit as set forth in claim 1 wherein said container and said first and second tabs are fabricated of fusible fabric, and first and second fused seams outlining said elongated slot and said compartment, respectively.

5. In a refrigerant accumulator having a housing with a bottom wall and a side wall and a U-shaped pipe with a return bend adjacent said bottom wall and with first and second pipe portions extending from said return bend along said side wall, and a filter body extending outwardly from said return bend, the improvement of an adsorbent unit comprising a porous adsorbent container, adsorbent in said container, first and second end portions on said container, a first tab extending outwardly from said first end portion of said container, an elongated slot in said first tab mounting said first tab on said first and second pipe portions, a second tab extending outwardly from said second end portion of said container, an aperture on said second tab mounting said second tab on said filter body, and a compartment on said first tab containing a fluent refrigerant tracer dye.

6. In a refrigerant accumulator as set forth in claim 5 wherein said container includes a convex side which fits between said first and second pipe portions.

7. In a refrigerant accumulator as set forth in claim 5 wherein said container and said first and second tabs are fabricated of fusible fabric, and first and second fused seams outlining said elongated slot and said compartment, respectively.

8. In a refrigerant accumulator as set forth in claim 7 wherein said first and second tabs are substantially planar.

9. An adsorbent unit for mounting relative to a U-bend pipe of a refrigerant accumulator having spaced pipes and a return bend having a filter body on its underside comprising a porous container, adsorbent in said container, first and second end portions on said container, first mounting means on said first end portion for placement about said spaced pipes with said container located between said first mounting means and said return bend, second mounting means at said second end of said container for mounting on said filter body on said U-bend pipe, and a separate compartment on said adsorbent unit outside of said container containing a fluent refrigerant tracer dye.

10. An adsorbent unit as set forth in claim 9 wherein said porous container and said first and second mounting means are fabricated from fusible fabric.

11. An adsorbent unit for mounting relative to a U-bend pipe of a refrigerant accumulator having spaced pipes and a return bend comprising a porous container, adsorbent in said container, first and second end portions on said container, first mounting means on said first end portion for placement about said spaced pipes with said container located between said first mounting means and said return bend, second mounting means at said second end of said container for mounting relative to said return bend, and a separate compartment on said adsorbent unit outside of said container containing a fluent refrigerant tracer dye.

12. An adsorbent unit as set forth in claim 11 wherein said porous container and said first and second mounting means are fabricated from fusible fabric.

13. An adsorbent unit for an air conditioning system comprising a porous container, adsorbent in said container, a fluent refrigerant tracer dye, and a separate compartment on said adsorbent unit outside of said porous container containing said fluent refrigerant tracer dye.

14. An adsorbent unit as set forth in claim 13 wherein said compartment is immediately adjacent to said container.

15. An adsorbent unit as set forth in claim 13 wherein said compartment is a part of said adsorbent unit which is separate from said container.

16. An adsorbent unit as set forth in claim 13 wherein said adsorbent unit includes a tab, and wherein said separate compartment is located on said tab.

17. An adsorbent unit as set forth in claim 13 wherein said adsorbent unit has a longitudinal centerline, a tab on said container, and a longitudinal slit in said tab extending transversely to said longitudinal centerline.

18. An adsorbent unit as set forth in claim 17 wherein said slit is curved.

19. An adsorbent unit as set forth in claim 17 wherein said container includes a wide portion proximate said tab and a narrow portion remote from said tab.

20. An adsorbent unit as set forth in claim 13 wherein said container includes a wide portion proximate said tab and a narrow portion remote from said tab.

21. An adsorbent unit comprising a porous adsorbent container having a width, adsorbent in said container, a tab extending outwardly from said container, an elongated slot in said tab extending in the direction of said width of said container and said tab having a length which approximates the widest portion of said container, and a compartment on said tab containing a fluent refrigerant tracer dye.

* * * * *